Nov. 4, 1958   C. W. STICKLEY   2,859,077
PISTON
Filed Aug. 2, 1956
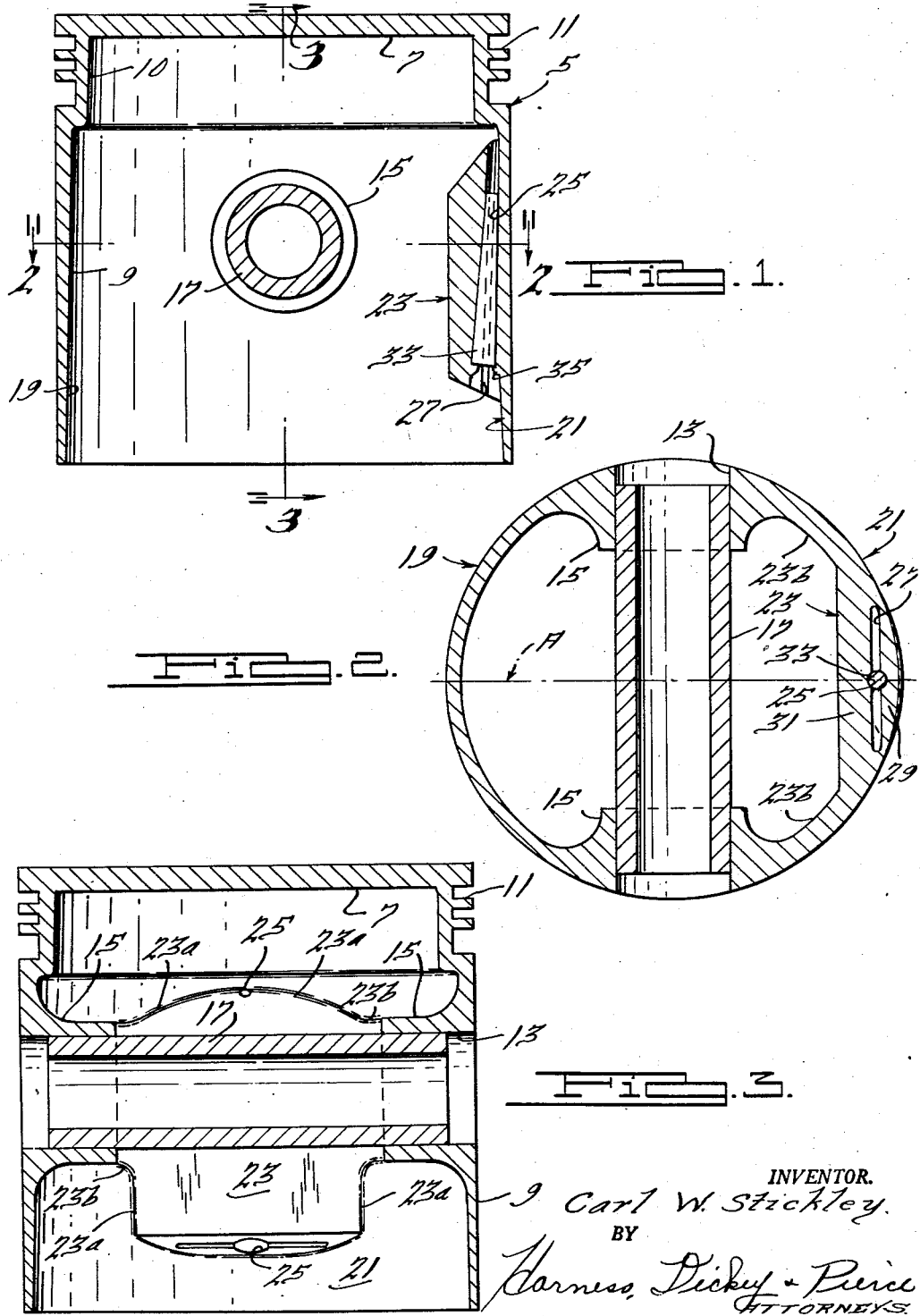
INVENTOR.
Carl W. Stickley.
BY
Harness, Dickey & Pierce.
ATTORNEYS.

United States Patent Office 2,859,077
Patented Nov. 4, 1958

2,859,077
PISTON

Carl W. Stickley, Pontiac, Mich.

Application August 2, 1956, Serial No. 601,803

3 Claims. (Cl. 309—12)

This invention relates to pistons for internal combustion engines or the like.

Among the objects of the invention are to provide a relatively simple and low cost improved piston construction which may be fitted to a cylinder with a sufficiently small clearance to avoid piston slap; to provide a piston having improved means for expanding the skirt thereof to make it conform more closely to the cylinder in which such piston operates; and to provide an improved piston construction in which the skirt is adapted to be progressively expanded an amount necessary to fit the piston within the cylinder therefor.

The above and related objects will become apparent during the course of the following description taken in conjunction with the accompanying drawings.

In the drawings:

Figure 1 is a longitudinal sectional view of a piston embodying the invention;

Fig. 2 is a transverse sectional view along the line 2—2 of Fig. 1; and

Fig. 3 is a longitudinal sectional view along the line 3—3 of Fig. 1.

The piston of this invention, generally designated 5, has a head 7 and a substantially tubular depending skirt 9, the upper portion 10 of which is of smaller diameter and may be provided with any number of ring grooves 11, these being well-known and constituting no part of the present invention. Below the upper portion 10 of the skirt 9 an opening 13 extends transversely through the continuous solid skirt wall at diametrically opposed points. Each end of the opening 13 is formed with an inwardly projecting wrist pin boss 15 for retaining a wrist pin 17 to which is attached a connecting rod (not shown.)

Perpendicularly disposed with respect to the axis of the wrist pin are opposite skirt portions, generally designated 19, 21. The improved means for expanding the skirt 9 includes an internal boss 23 formed integrally with the internal surface of the skirt portion 21. The internal boss 23 extends lengthwise a major distance along the length of the skirt 9 from below the upper portion 10 to a point short of the bottom thereof. As best appears in Fig. 2, the internal boss 23 is preferably segmental in cross-section and extends circumferentially a major distance along the internal surface of the skirt portion 21. Also, the internal boss 23 is substantially thicker than the skirt wall and is blended in with the internal surface of the skirt portion 21, as at 23a, and with the wrist pin bosses 15 as at 23b.

An opening 25, tapered in the direction of the head 7, is formed in the internal boss 23 and is disposed centrally thereof on the piston diameter A. The opening 25 extends lengthwise of the skirt 9 and has its axis disposed at an angle with respect to the longitudinal axis of the piston. A slot 27 extends transversely of the piston in opposite directions from the opening 25 and divides the internal boss 23 lengthwise into an outer section 29 and an inner section 31. The slot 27 thus provides for movement of the outer section 29 substantially radially outwardly of the piston relative to the inner section 31 as will more clearly appear hereinafter.

A dowel or pin 33, tapered to conform to the taper of the opening 25, is adapted to be wedged lengthwise therein from below the internal boss 23. Insertion of the pin 33 acts to wedge the boss sections 29 and 31 apart and widen the slot 27. As a result, the skirt portion 21 is expanded outwardly as shown in Fig. 2 relative to its position, indicated in dotted lines, before insertion of the pin 33.

In practice the pin 33 is driven entirely into the opening 25 and the piston 5 is inserted in its cylinder to determine the closeness of the fit. If the fit is too loose, the pin 33 is moved further into the opening 25 and the piston is again tried for size in its cylinder. This procedure is then repeated as many times as necessary until the desired close fit of the piston in the cylinder is achieved. A staking tool is then applied to the boss 23 at the lower end of the pin 33 to deform the boss 23, as shown at 35, against the large end of the pin 33 to positively prevent withdrawal of the pin 33.

At the present time it is customary to grind pistons to an ovate cross-sectional shape, these being the so-called cam-ground pistons and the present invention provides a simple means for expansion of cylindrical pistons into such contour.

The present invention thus provides an improved piston having a skirt portion which is expandable by a securely retained wedge to more closely conform to the cylinder and in which the various objects hereinabove set forth, together with many thoroughly practical advantages are successfully achieved.

While the preferred embodiment of the invention has been shown and described, it will be apparent that the same is susceptible to modification and change without departing from the spirit of the invention or the scope of the appended claims.

What is claimed is:

1. In a piston having a head and a substantially tubular skirt depending therefrom, said skirt having a wrist pin opening extending transversely therethrough, means forming a boss within said skirt and on a portion thereof located on a diameter of the skirt arranged at substantially ninety degrees relative to said wrist pin opening, said boss having a tapered opening extended therethrough in a direction longitudinally of said piston and a slot communicating with and extended in opposite directions from said opening, with said slot being positioned to divide said boss into a pair of sections one of which is arranged outwardly of the other in a direction radially of said skirt, and a tapered wedge member progressively insertable into said opening to progressively enlarge said slot and move said one section radially outwardly of said skirt and thereby expand said piston.

2. In a piston having a head and a substantially tubular skirt depending from said head, a boss formed on the inner surface of a portion of said skirt and extended longitudinally thereof, said boss having an opening extended longitudinally therethrough and tapered in a direction toward said head, means forming a slot in said boss extended longitudinally thereof, said slot communicating with said opening and being positioned so as to divide said boss into a pair of sections spaced apart in a direction radially of said skirt, and a tapered wedge member movable into said opening for moving said sections apart to thereby expand said skirt.

3. In a piston having a head and a substantially tubular skirt depending from said head, a boss formed on the inner surface of a portion of said skirt and extended longitudinally thereof, said boss having an opening formed therein and extended longitudinally of said skirt, with said opening tapering in a direction toward said head, said boss having a slot formed therein communicating with said opening and positioned so as to divide said boss into a pair of sections spaced radially of said skirt, a tapered wedge member progressively insertable in said opening to a position disposed entirely therein to move said sections further apart, and with said boss being deformable into engagement with one end of said wedge member to maintain said wedge member within said opening.

References Cited in the file of this patent

UNITED STATES PATENTS

| | | |
|---|---|---|
| 2,005,373 | Johnston | June 18, 1935 |
| 2,087,761 | Johnston | July 20, 1937 |
| 2,319,006 | Marien et al. | May 11, 1943 |
| 2,462,550 | Ramspeck | Feb. 22, 1949 |